March 26, 1968  C. J. WENZKE  3,374,637
RECOVERY OF CHLORINE
Filed Dec. 13, 1965

INVENTOR.
CARROLL J. WENZKE
BY
*Thomas J. Graham*
ATTORNEY.

United States Patent Office 3,374,637
Patented Mar. 26, 1968

3,374,637
RECOVERY OF CHLORINE
Carroll J. Wenzke, Peekskill, N.Y., assignor to FMC Corporation, New York, N.Y., a corporation of Delaware
Filed Dec. 13, 1965, Ser. No. 513,345
10 Claims. (Cl. 62—23)

ABSTRACT OF THE DISCLOSURE

A process for separating chlorine from a mixture of chlorine and inert gases (inerts) in which said mixture is compressed to between 3 and 15 atmospheres and cooled to produce one stream containing liquid chlorine which is recovered, and a second stream containing chlorine together with substantially all of the inerts. The second stream of chlorine and inerts is refrigerated to a temperature of at least $-80°$ F. to liquify chlorine and produce a mixture of liquid chlorine and gases which is separated into two fractions. The first fraction contains substantially all of the liquid chlorine and a minor portion, e.g., 25% of the inerts, and a second fraction containing a major portion of said inerts. The first fraction is then volatilized in heat exchange relationship to the hereinbefore defined second stream of chlorine and inerts being refrigerated to provide the necessary refrigeration to lower the temperature of said compressed mixture to at least $-80°$ F.

---

This invention is directed to processes for separating gases, and to apparatus useful in such processes.

Chlorine produced in electrolytic processes is contaminated with such gases as carbon dioxide, nitrogen, oxygen, hydrogen, etc. (herein referred to collectively as "inerts" and/or "inert gases"). In certain mixtures it is necessary to add additional air so that the hydrogen-chlorine mixtures will not reach the explosive range during the separation of the chlorine and the other gases. Several processes have been developed or suggested for separating the chlorine from these gases so that product chlorine of commercial purity may be liquified for transportation and/or sale. Such processes condense chlorine by use of refrigeration or compression or a combination of both, to produce two products; a liquid chlorine, and a gaseous product containing the inerts together with chlorine in amounts sufficiently large so that the process is uneconomic unless this chlorine is recovered. Various physical and chemical techniques have been suggested for such recovery. Known processes to accomplish this have required complex equipment with high heat and power requirements and consequent large capital investment, or have produced by-product chemicals which must be sold for the process to be economic.

It is an object of the present invention to provide an improved process for recovering chlorine from a mixture of gases.

It is also an object of this invention to provide a process for removing gaseous contaminants from chlorine.

It is another object of this invention to provide apparatus useful for such processes.

Figure 1:
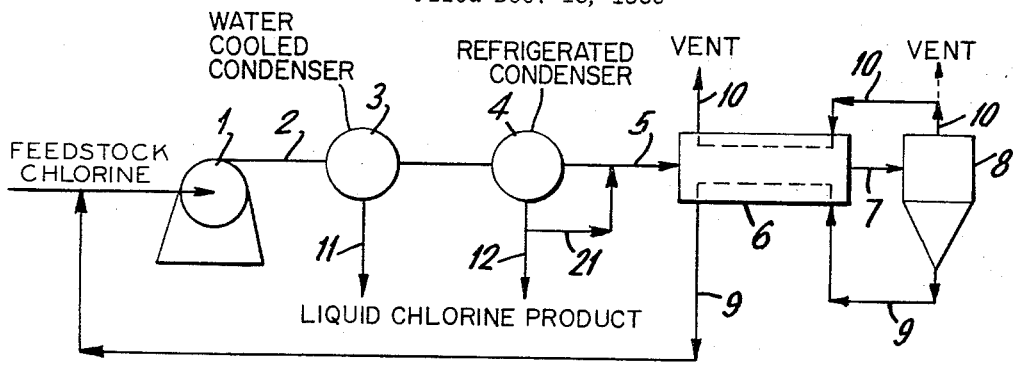
Figure 2:
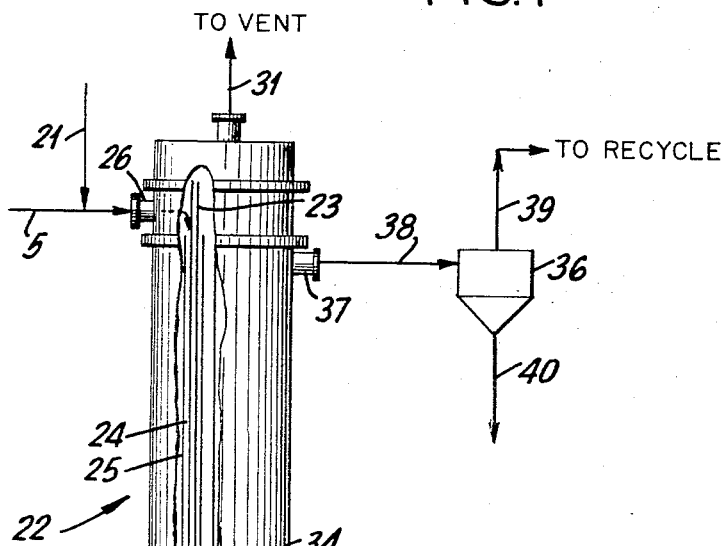

Other objects and advantages of this invention will in part be obvious and will in part become apparent from the specification and drawings in which FIGURE 1 is a flowsheet of the overall process, and
FIGURE 2 is a schematic illustration of apparatus used in the process.

My invention contemplates recovering chlorine almost completely from a mixture of chlorine and inert gases by compressing said mixture to between about three and fifteen atmospheres, preferably between six and ten atmospheres, cooling said mixture of compressed gases to condense out (1) a liquid chlorine product and (2) a compressed gaseous mixture containing a portion of the chlorine together with the inerts. This gaseous mixture is further separated into two gaseous fractions. The first fraction contains substantially all of the liquid chlorine and a minor portion of said inerts. The second fraction contains a major portion of the inerts and is nearly devoid of chlorine. It is vented. The first fraction containing substantially all the chlorine is recycled to the compressor. The separation of said compressed gaseous mixture (2) containing the inerts into two fractions, as noted hereinbefore, is preferably achieved through a low temperature pressure reduction process using a separating heat exchanger which does not require separate external refrigeration or moving parts. The first fraction which contains substantially all the chlorine and a minor fraction of the inerts, before being recycled to the compressor, is reduced in pressure, preferably to about one atmosphere, and is passed in heat exchange relationship with the compressed mixture (2) of chlorine together with the inerts to refrigerate said mixture of chlorines and inerts to a temperature of at least $-80°$ F., causing the major portion of the chlorine in the mixture to become liquid.

Said first fraction containing the minor portion of the inerts, contains from about 10% to about 50% of the inerts originally in the gaseous mixture, and preferably about 25%, and said second containing the major portion of the inerts contains from about 50% to about 90% of those originally in the compressed mixture and preferably about 75%.

To achieve the required refrigeration of the compressed mixture of chlorine and inerts, it is preferred that both of said fractions which are obtained from said compressed mixture after refrigeration, should be utilized to refrigerate the compressed gaseous mixture of chlorine and inerts, prior to recycling, and venting, the respective fractions. It is also preferred that this heat exchange relationship be countercurrent in the manner described hereinafter. To enable the refrigeration of the compressed mixture of chlorine and inerts to the desired low temperature utilizing only said two fractions as the refrigerant, it is necessary to add liquid chlorine to said compressed mixture of chlorine and inerts to achieve a heat balance in the system.

The mixture of chlorine and inert gas refrigerated may be initially at the desired high pressure, having been discharged from a chlorine liquefaction system wherein the main mass of chlorine was liquefied at high pressure by means of water or refrigerated brine cooling, or both in series. When utilizing a system of this type, the first step of the process of this invention, which consists of compressing a gaseous mixture of chlorine and inerts, is considered to have been accomplished in the chlorine liquefaction system from which these materials are obtained. Utilizing such a system, the recycled fraction containing the chlorine and a minor portion of the inerts would be the only materials specifically compressed for this operation.

The invention will be more clearly understood with reference to the illustrative example disclosed in connection with the embodiments of the continuous processes illustrated in FIGURES 1 and 2. All parts and percentages are by weight. The quantities specified are per hour of process operation.

Referring first to FIGURE 1 which is a flow sheet of the overall operation, a chlorine gas containing feed stock containing major amounts of contaminating gases including inerts is fed to compressor 1 where it is compressed to between about three and fifteen atmospheres. The product of the compressor 1 is then passed sequentially from line 2 into condensors 3 and 4 and separated into two streams, liquid chlorine product streams 11 and 12, and a gaseous stream 5 containing chlorine together with substantially all of the contaminant gases including the inerts. In the two-stage preferred condensation system illustrated, chlorine condenser 3 is a water-cooled condenser; chlorine condenser 4 is a refrigerated, preferably brine cooled, condenser. Condensing systems of other suitable designs, including a single condensing unit, such as a water cooled condenser, may be used in place of the two-stage unit described. Stream 5 is refrigerated in heat exchanger 6 to a temperature of at least −80° F. and then passed through stream 7 to separator 8 where the refrigerated mixture of gases is separated into two streams; stream 9 containing substantially all of the liquid chlorine and a minor portion of the inerts, and a gaseous stream 10 containing the major portion of the inerts. In the preferred embodiment of this invention, streams 9 and 10 are utilized as the coolant in heat exchanger 6, after passing through pressure reduction valves 13 and 14, respectively, thus avoiding the need of an external coolant. The inert gas containing stream 10 is passed to and through heat exchanger 6 and then vented. Stream 9 is passed through the heat exchanger 6 and then recycled to compressor 1.

A more specific example of the process which also illustrated details of the preferred apparatus follows: a chlorine containing feed stock containing 962 pounds of chlorine and major amounts of contaminating gases leaves condenser 3 of FIGURE 1 at seven atmospheres. The stream is then separated in condenser 4 into two streams, a liquid stream containing 587 pounds of chlorine, and a gaseous stream containing 375 pounds of chlorine, 2.52 pounds of hydrogen, 127.7 pounds of inert gases, and 609 pounds of air, all at a temperature of −20° F. The removal of inerts from this mixture and the recovery of chlorine is illustrated with particular reference to FIGURE 2, in which heat exchanger 22 is used in place of the heat exchanger 6 in the flow sheet of FIGURE 1; and separator 28 is used in place of the separator 8 of FIGURE 1. 71 pounds of liquid chloride is passed through line 21 into line 5 which contains said mixture of gases at −20° F. This mixture is then refrigerated in heat exchanger 22 which has a double row of concentric tubes with inner tube 23, and the inner shell condenser wall 25 forming annular space 24 surrounding inner tube 23.

The compressed gases from line 5 are introduced through nozzle 26 and pass down through annular space 24 to exit 27. During the passage through annular space 24, the gases are cooled to a temperature of about −120° F. and all, or substantially all, of the chlorine is liquefied. The cooled gaseous mixture containing the liquefied chlorine is passed to separator 28, a small cyclone, in which it is divided into a largely gaseous portion exited from the top of the separator 28, and a largely liquid portion exited from the bottom of the separator 28.

The gaseous product containing about 75% of the inerts is passed through a pressure reduction valve 29 and brought down to one atmosphere with a temperature drop of about 6° F. due to the Joule-Thompson effect. This gaseous product is then passed into heat exchanger 22 through port 30 and into inner tube 23 counter-current to the incoming gases in annular space 24, and picks up heat from said incoming gases. The warmed gases from tube 23, which contain 1.89 pounds of hydrogen, 95.8 pounds of inert gases, 456.8 pounds of air, and 4.6 pounds of chlorine, and are vented through exit 31 at a temperature of about −52° F.

The liquid product of separator 28 which contains the liquid chlorine and about 25% of the inert gases is passed through valve 32 and into port 33 to the shell side 34 of heat exchanger 22 and passes up through the shell side. The gases and liquid passing through valve 32 are reduced to one atmosphere pressure, resulting in an increase in volume of the inert gases and an immediate evaporation of part of the liquid chlorine. This material, after passage through valve 32 into entry port 33 is in the form of a foam or wet gas. During the passage through shell side 34 and over the shell side baffles 35, most of the liquid chlorine evaporates while in contact with the inert gases. The liquid-gas from the shell side 34 of the heat exchanger 22 is passed through exit 37 through line 38 to a cyclone separator 36, from which 10 pounds of liquid chlorine are drawn through line 40, and from which gases having a composition of 431.4 pounds of chlorine, 0.63 pound of hydrogen, 31.9 pounds of inert gases and 157.2 pounds of air, at a temperature of about −50° F., are recycled to the compressor 1 through line 39.

The exemplified process results in the recycling of about 25% of the inert constituents of the gas which increases the total duty requirements of the process equipment by about 6%.

The system may be operated at temperatures below about −80° F.; preferably operated at below about −120° F.; and optimally operated at about −140° F. The minimum temperature is limited by the freezing point of chlorine (−151° F.).

The system is simple, requiring only the heat exchanger and separator. No moving parts are required. Control of the system is simple. Valve 29 is a pressure control valve and adjusts the pressure in the system. Valve 32 adjusts the bottom temperature. Liquid chlorine is added to stream 5 to maintain some liquid flow from the heat exchanger shell 34 to separator 36. Some liquid chlorine, supplied through line 21, in the feed to heat exchanger 22 is required, since both exit gas streams leave at a temperature below that of the incoming gas stream 5. The refrigeration requirement is made up by evaporating part of the liquid chlorine obtained through stream 21.

The preferred heat exchange apparatus schematically illustrated in FIGURE 2 is a complex heat exchanger composed of two sets of concentric tubes rolled into two sets of tube sheets. A unit to process gases in the amounts described may be designed to a length of only about 22 feet long and a column 1 foot in diameter. It is possible to obtain 191 square feet of heat exchange surface by using a column having a double tube sheet with inner tubes ⅜" in diameter rolled into an outside tube sheet ⅝" in diameter.

Although the invention has been described in connection with specific embodiments, it is to be understood that it includes all modifications and variations that come within the scope of the appended claims.

What is claimed is:
1. The process for separating chlorine from a mixture of chlorine and inerts including nitrogen comprising
 (i) compressing said mixture of gases to a pressure of between three and fifteen atmospheres and condensing a portion of said mixture of gases to produce one stream containing liquid chlorine which is recovered, and a second stream containing chlorine together with substantially all of said inerts at a pressure between three and fifteen atmospheres,
 (ii) refrigerating the compressed mixture of chlorine and inerts to a temperature of at least −80° F. to liquefy chlorine and produce a mixture of liquid chlorine and gas,
 (iii) subsequently separating said mixture of liquid chlorine and gas into two physically separated fractions, the liquid fraction containing substantially all of the liquid chlorine and between 10% and 50% of said inerts, and a second gas fraction containing between 90% and 50% of said inerts,
 (iv) reducing the pressure of said liquid fraction containing substantially all of the liquid chlorine and a minor portion of the inerts to vaporize said liquid chlorine and utilizing the refrigeration resulting from said vaporization to provide at least a portion of the refrigeration requirements for operation (ii) hereof, and

(v) recycling said evaporated fraction containing the chlorine and the minor portion of said inerts to operation (i) hereof.

2. The process of claim 1 wherein, in operation (iv), said fraction containing substantially all of said chlorine and a minor portion of the inerts is evaporated and passed in counter current heat exchange relationship to said compressed mixture of chlorine and inerts being refrigerated in operation (ii) thereof.

3. The process of claim 2 wherein the refrigerated stream containing the major portion of inerts is also passed in heat exchange relationship to said compressed mixture of chlorine and inerts in operation (ii), and is then vented.

4. The process of claim 3 wherein liquid chlorine is added to said compressed mixture of chlorine and inerts prior to the refrigeration of said mixture in operation (ii) thereof.

5. The process of claim 4 wherein said compressed mixture of chlorine and inerts is at a pressure of between six and ten atmospheres and is refrigerated to a temperature of below −120° F.

6. The process of claim 5 wherein said mixture of compressed gases of operation (i) thereof is condensed in a water cooled chlorine condenser.

7. The process of claim 5 wherein said mixture of compressed gases of operation (i) thereof is condensed in a two-stage operation, the first stage being a water-cooled condenser, and the second stage being a refrigerated condenser; and wherein the liquid chlorine which is added to said compressed mixture of chlorine and inerts specified in claim 4 hereof, is obtained from said second stage refrigerated condenser.

8. The process of claim 1 wherein (i) said gaseous mixture is compressed to a pressure of between six and ten atmospheres, (ii) said compressed gaseous mixture is refrigerated in a heat exchanger to a temperature of between −120° F. and −150° F. whereby gaseous chlorine in said mixture is liquefied, and said liquid chlorine containing gaseous mixture is removed from said heat exchanger, (iii) said liquid chlorine containing gaseous mixture is divided into two separate fractions, a chlorine-rich fraction containing between 10% and 50% of said inerts, and a second fraction containing between 90% and 50% of said inerts;

(iv) the pressure of said second fraction is reduced to about one atmosphere and said second fraction is passed through said heat exchanger in counter-current heat exchange relationship with said compressed gaseous mixture being refrigerated, and is then vented, and the pressure of said chlorine-rich fraction is reduced to about one atmosphere and said fraction is passed through said heat exchanger in counter-current heat exchange relationship with said compressed gaseous mixture being refrigerated whereby liquid chlorine in said chlorine-rich fraction is evaporated at temperatures below that at which liquid chlorine is being condensed in said compressed gaseous mixture, and then (v) said chlorine-rich fraction is recycled to a compressor where it is compressed to the initial pressure of the feed.

9. The process of claim 8 wherein said chlorine-rich fraction contains about 25% of said inerts and said second fraction contains about 75% of said inerts.

10. The process of claim 9 wherein said compressed gaseous mixture is at a pressure of about seven atmospheres.

References Cited

UNITED STATES PATENTS

| | | | |
|---|---|---|---|
| 1,876,551 | 9/1932 | Barstow et al. | 62—23 |
| 1,913,628 | 6/1933 | Falkenberg. | |
| 2,754,666 | 7/1956 | Spitzer | 62—23 |
| 3,230,724 | 1/1966 | Havas | 62—11 X |

NORMAN YUDKOFF, *Primary Examiner.*

V. W. PRETKA, *Assistant Examiner.*